UNITED STATES PATENT OFFICE.

DAVID FEIGENSOHN, OF NEW YORK, N. Y.

TOOTHACHE REMEDY.

1,053,720.

No Drawing.

Specification of Letters Patent.

Patented Feb. 18, 1913.

Application filed June 27, 1911. Serial No. 635,665.

*To all whom it may concern:*

Be it known that I, DAVID FEIGENSOHN, a citizen of the United States, and a resident of the city of New York, borough of Manhattan, in the county and State of New York, have invented a new and Improved Toothache Remedy, of which the following is a full, clear, and exact description.

The object of the invention is to provide a new and improved toothache remedy to be used for the relief of pain occasioned by toothache, and as a temporary filling for the affected tooth.

The composition consists of the following ingredients in about the proportions stated:

Prepared chalk _____ 5 parts.
Petrolatum _____ 4 parts.
Cresylic acid _____ 1 part.

The ingredients are thoroughly mixed to form a paste which can be readily placed into a tooth to fill the entire cavity. Instead of petrolatum I may use glycerin. The prepared chalk of the composition forms the aggregate while the petrolatum or the glycerin is the vehicle or matrix and keeps the moisture in a plastic state, and the cresylic acid is the toothache remedy and has the desired healing and antiseptic properties.

In practice a small piece of blotting paper is placed over the cavity of the tooth after the same is filled with the paste, and the blotting paper is allowed to remain for about a minute so that it absorbs all surplus fluid, to insure a ready and quick hardening of the paste, which thus forms a temporary filling of the tooth.

It is understood that the composition ordinarily remains in paste form and when filled into a tooth cavity and subjected to the action of the blotting paper, as above described, a sufficient amount of the two liquid ingredients of the composition, to wit, the cresylic acid and the petrolatum or glycerin, is taken up by the blotting paper and hence withdrawn from the composition to permit the latter to harden sufficiently to form a temporary filling. By the extraction of a portion of the liquid ingredients the paste form of the composition is changed into a putty-like substance.

By the use of the paste in an affected tooth, quick relief of pain is had, and at the same time the paste on hardening forms a temporary filling thus protecting the nerve and pulp of the tooth against air, solid food and hot and cold liquids.

The composition of matter owing to its small percentage of cresylic acid is harmless and non-poisonous, and on account of being in the form of a paste can be readily placed in position in the cavity or on any other portion of a tooth without danger of spreading all over the mouth and burning the tissues.

Having thus described my invention, I claim as new and desire to secure by Letters Patent:

1. The herein described composition normally in the form of a paste and to be used as a toothache remedy and temporary filling, consisting of an aggregate, a liquid toothache remedy and a liquid vehicle, the said liquid toothache remedy and the said liquid vehicle being of a character to keep the composition normally in paste form for filling it into a tooth cavity, the composition being of a consistency to permit withdrawal therefrom of a portion of the liquid, and of a character to thereafter harden sufficiently for forming a temporary filling.

2. The herein described composition, normally in the form of a paste and to be used as a toothache remedy and temporary filling, consisting of prepared chalk forming the aggregate, cresylic acid forming the toothache remedy, and glycerin forming the vehicle, the said cresylic acid and the said glycerin keeping the composition in paste form for filling it into a tooth cavity, the composition when so applied and subjected to the action of a contacting blotting paper being of a consistency to be deprived of a portion of its moisture, and of a character to harden sufficiently to form a temporary filling for the tooth.

Signed at New York in the county of New York and State of New York this 23rd day of June A. D. 1911.

DAVID FEIGENSOHN.

Witnesses:
ABRAHAM S. COHEN,
SARAH BENSON.